(12) United States Patent
Stumpf et al.

(10) Patent No.: US 8,858,705 B2
(45) Date of Patent: Oct. 14, 2014

(54) PROCESS FOR THE PRODUCTION OF BINDERS

(75) Inventors: Thomas Stumpf, Bad Harzburg (DE);
Ulf Boenkendorf, Holle (DE);
Leonhard Baumann, Aldersbach (DE);
Roland Möller, Bad Harzburg (DE)

(73) Assignee: Ecloloop GmbH, Goslar (DE)

( * ) Notice: Subject to any disclaimer, the term of this patent is extended or adjusted under 35 U.S.C. 154(b) by 0 days.

(21) Appl. No.: 14/005,732

(22) PCT Filed: Mar. 16, 2012

(86) PCT No.: PCT/EP2012/001194
§ 371 (c)(1),
(2), (4) Date: Jan. 17, 2014

(87) PCT Pub. No.: WO2012/126598
PCT Pub. Date: Sep. 27, 2012

(65) Prior Publication Data
US 2014/0123878 A1     May 8, 2014

(30) Foreign Application Priority Data
Mar. 18, 2011   (DE) .......................... 10 2011 014 346

(51) Int. Cl.
| | | |
|---|---|---|
| *C04B 7/30* | (2006.01) | |
| *C04B 7/24* | (2006.01) | |
| *C04B 7/40* | (2006.01) | |
| *C04B 7/32* | (2006.01) | |

(52) U.S. Cl.
CPC ... *C04B 7/32* (2013.01); *C04B 7/30* (2013.01); *C04B 7/40* (2013.01); *C04B 7/24* (2013.01)
USPC ............................. 106/745; 106/739; 106/753

(58) Field of Classification Search
CPC .............. C04B 7/24; C04B 7/30; C04B 7/36; C04B 7/40; C04B 7/42; C04B 7/421; C04B 7/424; C04B 7/428; C04B 7/44; C04B 7/46
USPC ......................................... 106/739, 745, 753
See application file for complete search history.

(56) References Cited

U.S. PATENT DOCUMENTS

| | | | | |
|---|---|---|---|---|
| 3,560,369 | A * | 2/1971 | Rowland et al. .............. | 208/407 |
| 4,110,193 | A * | 8/1978 | Gwyn et al. .................. | 208/410 |
| 4,226,586 | A * | 10/1980 | Brachthauser et al. ....... | 432/106 |
| 4,256,502 | A | 3/1981 | Lovichi et al. | |
| 4,367,095 | A * | 1/1983 | Namy ........................... | 106/743 |
| 2012/0255462 | A1 * | 10/2012 | Gasafi et al. .................. | 106/692 |

FOREIGN PATENT DOCUMENTS

| | | |
|---|---|---|
| DE | 385 624 | 11/1923 |
| DE | 427 801 | 4/1926 |
| DE | 552 975 | 6/1932 |
| DE | 567 531 | 1/1933 |
| DE | 853 722 | 10/1952 |
| GB | 951211 | 3/1964 |
| WO | WO 2010/066316 | 6/2010 |

OTHER PUBLICATIONS

Rohrbach R: "Herstellung von Oelschieferzement und Gewinnung elektrischer Energie aus Oelschiefer nach dem Rohrbach-Lurgi-Verfahren", Zkg. Zement, Kalk, Gips, Bauverlag, Wiesbaden, DE, vol. 58, No. 7, Jul. 1, 1969, 11 pages.
Burnham A K, et al.: "Effects of gas environment on mineral reactions in Colorado oil shale", Fuel, IPC Science and Technology Press, Guildford, GB, vol. 59, No. 12, Dec. 1, 1980, pp. 871-877.
Arnon Bentur et al.: "Modification of the Cementing Properties of Oil Shale Ash", American Ceramic Society Bulletin, vol. 63, No. 2, Jan. 1, 1984, pp. 290-300.
Ish-Shalom M, et al.: "Cementing Properties of oil Shale Ash: I. Effect of Burning Method and Temperature", Cement and Concrete Research, Pergamon Press, Elmsford, NY, US, vol. 10, No. 6, Nov. 1, 1980, pp. 799-807.
International Search Report for PCT/EP2012/001194 dated Aug. 30, 2012.
International Preliminary Report on Patentability for PCT/EP2012/001194 dated Sep. 19, 2013.

* cited by examiner

*Primary Examiner* — Anthony J Green
(74) *Attorney, Agent, or Firm* — Marvin Petry; Stites & Harbison PLLC

(57) ABSTRACT

The invention relates to a process for the production of binders by calcinating mineral raw material mixtures. In order to improve the process and the quality of the binders, it is proposed that oil shale and/or oil sand fills are converted by targeted agglomeration into particles of a certain size and consistency, wherein the water content for the mechanical stabilization of the agglomerate is adjusted to less than 25 percent and the agglomerates are calcinated to form binders at temperatures between 800 and 1500° C. under reductive conditions over the entire process with a Lambda value <1 in a vertical shaft furnace with updraft gasification. The binding properties are adjusted by the targeted addition of CaO-containing substances and/or existing sulfur fractions of the oil sands and/or oil shales are bound by means of the CaO that is present in the starting material and/or added.

22 Claims, 1 Drawing Sheet

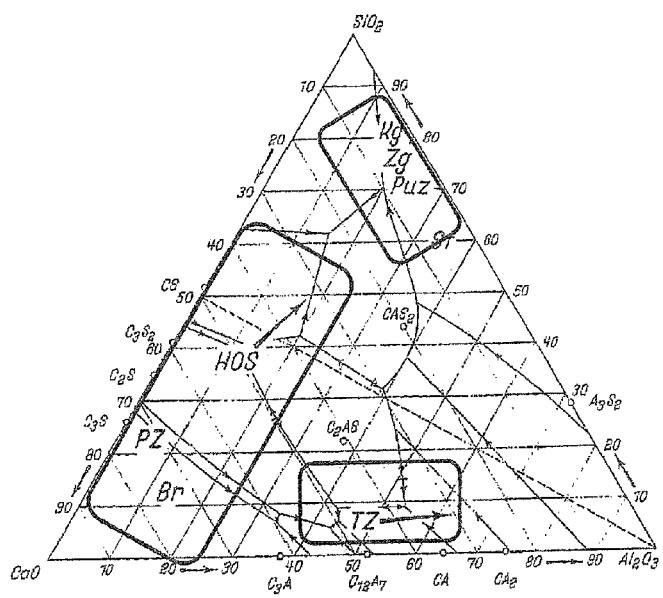
PZ = Cement clinker; TZ = Numinous cement, arrow towards high-duty heat-resistant TZ; HOS = Blast furnace slag, arrow towards acid HOS; Br =Cignite slag; St = Coal slag and granulate; PuZ = pozzolana, trass; Zg = brick – dust; Kg = Diatomite (diatomaceous earth, moler earth)

PROCESS FOR THE PRODUCTION OF BINDERS

FIELD OF THE INVENTION

The invention relates to a process for the production of binders by burning mineral raw-material mixtures.

BACKGROUND OF THE INVENTION

Such raw-material mixtures for instance contain oil sands and oil shale.

Oil sands and oil shale are sedimentary rocks that occur worldwide and depending on where they are located contain from 5 mol-% to 65 mol-% organic substance, known as kerogen.

A mixture of clay, silicates, water and hydrocarbons is called oil sand. Because of this mineralogical composition, oil sands have high proportions of SiO2, $CaCO_3$, $Al_2O_3$, and $Fe_2O_3$.

The inorganic ingredients of oil shale are essentially clay materials, quartz and feldspar, as well as various proportions of CaO-containing compounds, in particular calcite containing lesser amounts of dolomite and/or gypsum. The result is an oxidic composition similar to oil sands. Because of its chemical-mineralogical composition, burned oil shale has long been known in the cement industry as a hydraulic binder or at least as a hydraulic additive.

Oil shale ash exhibits a wide fluctuation in its chemical composition, depending on where it is found:

| Ingredient | Concentration range in % |
|---|---|
| $SiO_2$ | 12 ... 51 |
| $Al_2O_3$ | 5 ... 16 |
| $Fe_2O_3$ | 6 ... 7 |
| CaO | 18 ... 60 |
| MgO | 1 ... 4 |
| $Na_2O + K_2O$ | 1 ... 2 |
| $SO_3$ | 5 ... 10 |

Thus burned oil shale, at low Ca contents, comprises calcined clay with pozzolanic properties, with sufficiently high CaO contents, particularly from dicalcium silicate and calcium aluminates. In the cement industry, these phases are known as carriers of the hydraulic qualities and are produced intentionally.

Among other things, burned oil shale is included in the European and German cement standards under the designation CEM II-T, according to DIN [German Industrial Standard] EN 196. With a compressive strength of at least 25 $N/mm^2$ when stored in humid air after 28 days, the burned oil shale is a primary ingredient in Portland shale cement.

In burning oil shale/sands, its high proportion of sulfur is problematic, as is the fact that because of the heterogeneous composition of the starting material, the burning methods used until now were not suitable for producing high-value binders of varying types.

SUMMARY OF THE INVENTION

The object of the present invention is to create a process for producing binders which is capable of operating economically even if with high proportions of sulfur and which is suitable for purposefully producing specific qualities of binders.

BRIEF DESCRIPTION OF THE DRAWINGS

The single figure illustrates the location of the hydraulic blinders and substances and of the pozzalanic substances in a Rankin-diagram Ca—$SiO_2$—$Al_2O_3$.

DETAILED DESCRIPTION OF THE INVENTION

According to the invention, this object is attained by a process in which oil shale and/or oil sand beds are converted by purposeful agglomeration into particles of a certain size and consistency, and the water component is adjusted to less than 25% for mechanically stabilizing the agglomerate, and the agglomerates are burned at temperatures between 800° C. and 1500° C. under reductive conditions throughout the entire process at a lambda <1 in a vertical shaft furnace with countercurrent gasification into binders, and the binder properties are adjusted by purposeful addition of CaO-containing substances and/or sulfur components of the oil sand and/or oil shale are bound by means of the CaO that is present in and/or added to the starting material.

First, the vertical shaft furnace offers the advantage of a process that proceeds continuously under defined process conditions, and the carbon compounds contained in the oil shale and/or oil sand can be optimally used for generating the necessary process heat. The rising gas flow, together with the bed, forms a kind of heat exchanger and furnishes the oxygen required for the reaction.

The purposeful addition of CaO yields two advantages. First, advantageous sulfur-binding mechanisms run under the reductive conditions of the process and for example make it possible to dispense with expensive flue gas desulfurization.

It should be noted that the CaO, added in a certain consistency, permits more purposeful variation of the process courses than does the CaO that is bound in an indefinite way in the natural oil shale and/or oil sand. Second, by the addition of the CaO, the quality of the binder can be adjusted. For instance, as a function also of the raw materials used, hydraulic and latent-hydraulic binders, pozzolanic binders, or aluminous cement binders can be produced. Typical compositions that can be produced by the process of the invention are shown in the attached Rankin diagram. In detail, these are:

Hydraulic or Latent-Hydraulic Binders:
  CaO in a proportion of 28-90%
  SiO2 in a proportion of 10-70%
  Al2O3 in a proportion of 2-25%.
Pozzolanic Binders:
  CaO in a proportion of 2-20%
  SiO2 in a proportion of 55-90%
  Al2O3 in a proportion of 8-45%.
Aluminous Binders:
  CaO in a proportion of 28-60%
  SiO2 in a proportion of 3-20%
  Al2O3 in a proportion of 40-70%.

Agglomeration in terms of the invention serves as a generic term for the process of mechanically increasing particle size and means putting together finely dispersed solid primary particles and binding them to one another to form larger particle composites, the agglomerates.

Agglomeration processes enable purposeful adjustment of the product properties of bulk materials, in this case the beds of oil shale and/or oil sand ingredients. For instance, product handling can be improved substantially by means of good pourability or a reduced proportion of dust or powder in the bulk material. However, such properties as disintegration behavior, the size, form and strength of the granulate, and shelf life or resistance to erosion can and must be adjusted in a defined way as well.

In general, a distinction is made between compression agglomeration and wet agglomeration.

In wet agglomeration, also called moist granulation, the powder to be agglomerated is mixed with a suitable liquid in such a way that capillary bonds can form between the particles, and thus a solid agglomerate that can withstand a mechanical load is created.

Corresponding laboratory or large industrial systems are pan granulators, rotary-drum granulators, granulating mixers, bit also fluidized-bed granulation. The process is employed for instance in the ceramics, building material and glass industries, metallurgy, environmental protection and for producing feeds and fertilizers.

In compression agglomeration, poured-out particles are densified by the exertion of external pressure forces. In the process, the number of contact surfaces between the particles increases; because of the reordering of the particles, the porosity decreases; and by the plastic deformation in the contact region, the adhesion is greatly increased. As a consequence of the high frictional forces that then occur, sintering processes can occur locally. With briquetting, the volume of the particle to be briquetted is consequently considerably reduced. Balling together, on the other hand, lends the material properties similar or equal to those of comparable massive material (such as coal, solid wood, and so forth).

The prerequisites for good outcomes of compression agglomeration are a suitable composition or properties, such as particle distribution, particle shape, porosity, and compressibility as well as stability of the individual raw-material components.

The shaped bodies produced by compression agglomeration can be improved markedly in their stability by using compression aids. Good success in stabilizing the agglomerates has been attained with, among other substances, paper fibers, wood meal, cellulose, sheet silicates/clay minerals, cellular concrete granulates, expanded perlite, pumice and/or further slight additions of variable particle composition (for example, 0-0.1 mm, 0.1-0.5 mm, 0.5-1.0 mm).

Since the composition and consistency of the natural forms of oil sand and oil shale can be quite heterogeneous, in many cases it is advantageous to perform a purposeful comminution of the oil sand and/or oil shale before the agglomeration steps, in order by means of the agglomeration to be able to create particles of uniform and defined size and composition, which in turn are made up of small particles adhering to one another. It is understood that this is impossible with initial dimensions that are in the range of the desired particle size or greater. It is equally impossible to mix ingredients of the oil shale that have been comminuted to a certain size into the bed, which at least partially comprises agglomerates.

The prerequisite for the function of these vertical shaft furnaces is a loose bed of the material to be burned, which because of its lumpiness forms a nip volume and thus ensures the flow of the appropriate burning and combustion gases through the bed. Since for both geological reasons and because of its breakdown and processing the starting material, that is, oil sand or oil shale, has fine components, these components must first be put into a grain size fraction that is accessible to the shaft furnace, or in other words is lumpy.

For producing these grain size fractions, conventional methods available on the market can be employed, such as wet agglomeration or compression agglomeration. The term compression agglomeration is understood in this invention to mean both compression by stamping presses or roller pressure machines as well as extrusion by extrusion presses or punch presses. Preferred grain size fractions exhibit a compact, rounded granular form and a volume between 20 and 60 cm$^3$.

A further prerequisite for the use in shaft furnaces is sufficient stability, both mechanically and thermally, of the agglomerates.

The mechanical stability is established especially by way of the proportion of liquid phases in the agglomerates; a proportion of less than 12% and even better less than 7% has proved itself over time. However, if the proportions are above those values but still below 25%, they can still be employed, although the necessary transportation and metering procedures lead to a greater proportion of undersized particles. However, their use in shaft furnaces can be ensured by screening out undersized particles above the reactor/shaft furnace.

The thermal stability is dependent on and controllable by way of the mineralogical and chemical composition of the agglomerates. What has to be taken into account is that the combustion gases from the organic components of the oils sands or oil shale can escape from the agglomerates; that is, the combustion gases are unable to build up any significant expansion pressure, which would cause the agglomerates to collapse. Agglomerates with a porosity of up to 25% and a raw density of at least 1.8 kg/l have proven themselves over time.

The process chosen offers the advantage that because of the fine-granular raw materials and the possibility of dispersing corrective substances homogeneously into the agglomerates, it is possible to establish a purposeful composition of the material to be burned and thus to establish the properties and quality of the end product. The sole limiting factor is the economical availability of suitable corrective substances.

The composition of oil sands and oil shale is shown in the following table:

| Ingredient | Concentration range in % |
|---|---|
| $SiO_2$ | 6 ... 25 |
| $Al_2O_3$ | 2 ... 7 |
| $Fe_2O_3$ | 3 ... 4 |
| $(Ca, Mg) CO_3$ | 18 ... 65 |
| $Na_2O + K_2O$ | 0.5 ... 1 |
| $SO_3$ | 2 ... 10 |
| Organic carbon compounds | 65 ... 5 |

The table shows a very wide range of the geologically dictated composition, but if one also takes the possible target composition of the product into account—as shown in red in the following drawing—a broad field of possible suitable products is the result.

The corrective substances can both from the existing deposit location in the range of the typically existing natural range of fluctuation in the chemical and mineralogical composition and by the delivery of external raw materials, such as quartz sand, limestone, clays, and other Ca, Si, Fe or Al carriers.

Classic (natural) raw materials in cement production are limestone and clay, or the naturally occurring mixtures of them—lime marl as well as sand and iron ore. However, the possibility also exists of using secondary raw materials, of which such examples as fly ash, rolling mill scale, steel works powders, and/or slags can be named.

At this point, the attached Rankin diagram should again be referred to; it shows that the field of possible products of hydraulic limes ranges from cements and latent-hydraulic binders to pozzolanic binders.

Naturally, a prerequisite for these binders is the appropriate burning of the raw-material mixtures. Typically, the necessary temperatures, which are dependent among other factors on the desired phases, are between 800° C. and 1500° C. Along with the decisive influence of the burning temperature, the duration of burning and other factors of furnace/reactor control must be taken into account.

Optionally, carbon-containing substances can also be metered in. The use of liquid and gaseous fuels is equally conceivable as the use of solid fuel, such as wood. This quantity can be made to excess in such a manner that the $CO_2$ liberated from combustion and deacidification is reduced with the carbon to CO in accordance with Boudouard's equilibrium. Simultaneously, the adherence to the reductive overall conditions can thus be controlled.

Characteristic phases of the burned product, depending on the adjustment of the raw-material mixture, are typically calcium aluminates, calcium silicates (di- and tricalcium silicate) and calcium sulfate. The calcium sulfate content of the burned oil shale or oil sand is generally sufficient for delaying hardening in standardized fashion. Optionally, to delay the hardening, the optimal calcium sulfate content can be established.

The hydraulic, latent-hydraulic or pozzolanic binder thus produced can be used, after being ground and optionally slaked, as a binder in the construction and building materials industries. Typical possible uses in the building materials industry is the production of concrete, mortar, finished concrete parts, and cellular concrete. For the construction industry, earthworks with the applications of soil stabilization or soil remediation can be named.

Because of the purposeful production possibilities and the narrow fluctuations in quality that can thus be achieved, the product can certainly be produced purposefully for high-value applications.

The invention claimed is:

1. A process for the production of binders by burning mineral a starting material of raw-material mixtures in a shaft furnace with countercurrent gasification, wherein oil shale and/or oil sand beds are converted by agglomeration into porous particles of a certain size and consistency, and a water component is adjusted to less than 25% and the porosity of the agglomerates is adjusted up to 25% for mechanically stabilizing the agglomerate, and the agglomerates are burned at temperatures between 800° C. and 1500° C. under reductive conditions throughout the entire process at a lambda <1 in a vertical shaft furnace with countercurrent gasification into binders, and the binder properties are adjusted by addition of CaO-containing substances and/or sulfur components of the oil sand and/or oil shale are bound by means of the CaO that is present in and/or added to the starting material.

2. The process of claim 1, wherein the oil shale and/or oil sand is comminuted prior to the agglomeration and/or the oil shale is comminuted to a certain size and added to a bed along with the agglomerates.

3. The process of claim 1, wherein the water component of the agglomerates amounts to less than 12%.

4. The process of claim 1, wherein the agglomerates have a raw density of at least 1.8 kg/l.

5. The process of claim 1, wherein the oil sand and/or oil shale is conditioned by wet agglomeration (moist granulation).

6. The process of claim 1, wherein the oil sand and/or oil shale is conditioned by compression agglomeration, wherein, particle accumulations are densified by the exertion of pressure.

7. The process of claim 6, wherein during the production of the agglomerates, compression aids are added.

8. The process of claim 7, wherein the compression aids comprise paper fibers, wood meal, cellulose and/or other carbon-containing substances, which are capable of oxidizing in the burning process.

9. The process of claim 7, wherein the compression aids contain sheet silicates/clay minerals, cellular concrete granulates, expanded perlite, pumice and/or further slight additions of variable particle composition.

10. The process of claim 1, wherein compression agglomeration is accomplished by stamping presses or roller pressure machines for compression or extrusion presses or punch presses for extrusion.

11. The process of claim 1, wherein for attaining a certain binder quality, external raw materials which contain quartz sand, limestone, clays, Ca, Si, Fe and/or Al carriers are added to the process.

12. The process of claim 1, wherein secondary raw materials are added to the process.

13. The process of claim 12, wherein the secondary raw materials consist of fly ash, rolling mill scale, steel works powders, and/or slags.

14. The process of claim 1, wherein calcium aluminates, calcium silicates and calcium sulfate are adjusted as characteristic phases for the binder produced.

15. The process claim 1, wherein the hydraulic, latent-hydraulic or pozzolanic binders are produced and ground up for use in the construction and building materials industries.

16. The process of claim 15, wherein the quicklime component of the binder is slaked before its final use.

17. The process of claim 1, wherein carbon-containing substances are metered into the process.

18. The process of claim 17, wherein the quantity of carbon-containing substances is made to excess in such a manner that CO2 liberated from combustion and deacidification is reduced along with carbon to CO in accordance with Boudouard's equilibrium.

19. The process of claim 1, wherein raw material additions are selected such that a hydraulic or latent-hydraulic binder is produced which contains at least the following ingredients:
CaO in a proportion of 28-90%
SiO2 in a proportion of 10-70%
Al2O3 in a proportion of 2-25%.

20. The process of claim 1, wherein raw material additions are selected such that a pozzolanic binder is produced which contains at least the following ingredients:
CaO in a proportion of 2-20%
SiO2 in a proportion of 55-90%
Al2O3 in a proportion of 8-45%.

21. The process of claim 1, wherein raw material additions are selected such that an aluminous binder is produced which contains at least the following ingredients:
CaO in a proportion of 28-60%
SiO2 in a proportion of 3-20%
Al2O3 in a proportion of 40-70%.

22. The process of claim 3, wherein the water component is less than 7%.

* * * * *

UNITED STATES PATENT AND TRADEMARK OFFICE
CERTIFICATE OF CORRECTION

PATENT NO. : 8,858,705 B2  
APPLICATION NO. : 14/005732  
DATED : October 14, 2014  
INVENTOR(S) : Stumpf It is certified that error appears in the above-identified patent and that said Letters Patent is hereby corrected as shown below:

TITLE PAGE:
change Item "(73) Assignee: Ecloloop GmbH, Goslar (DE)" to -- (73) Assignee: Ecoloop GmbH, Goslar (DE) --

Signed and Sealed this  
Third Day of November, 2015

Michelle K. Lee  
*Director of the United States Patent and Trademark Office*